Patented Sept. 3, 1946

2,407,135

UNITED STATES PATENT OFFICE 2,407,135

FURNACE LINING

Horace N. Clark, Bound Brook, N. J., assignor to Refractory & Insulation Corporation, New York, N. Y., a corporation of New Jersey No Drawing. Application September 8, 1943, Serial No. 501,522

6 Claims. (Cl. 106—104)

My invention relates to an improved lining for furnaces which is cast or molded from a refractory concrete.

One object of my invention is to provide a furnace lining cast or molded from a concrete which has a greater resistance against high temperatures than similar linings known in the art.

Another object of the invention is to provide a furnace lining cast from a concrete which contains a special refractory cement and a suitable filler and which, after the addition of water, will set quickly into a hard structure of considerable tensile strength and excellent resistance against high temperatures.

The term "furnace" as used in the present specification and claims is intended to include all kinds of chambers and passages which are subject to high temperatures, such as combustion chambers, boiler furnaces, flues etc.

It has been proposed to use for the manufacture of furnace linings concrete mixtures containing as binders so-called aluminous cements containing upwards of 30% alumina and about 15% to 30% impurities in the form of iron oxides and silicas. Generally, in aluminous cements, the content of iron oxide is above 5% because it is practically difficult to produce aluminous cements containing a smaller proportion of iron oxide and also because the tensile strength of the concretes made with aluminous cement binders is lowered when the iron oxide content of the cement drops to less than 5%. Although refractory concretes made with such aluminous cement binders have a greater resistance to high temperatures than ordinary concretes made with Portland cement or other cements consisting mainly of lime and silica, the maximum temperature to which such concretes can be subjected without danger of being destroyed by fusion is in the neighborhood of 2500° F. However, this temperature is considerably below the maximum temperatures of most industrial furnaces and consequently the refractory concrete mixtures made heretofore with aluminous cement binders could generally not be used for the casting of furnace linings.

According to the present invention, a special aluminous cement of very low iron oxide content is added to a suitable filler and water to yield a castable quick-setting mixture resulting in a refractory concrete capable of resisting temperatures up to and above 2800° F. and, therefore, useful for the lining of numerous types of furnaces, kilns, etc.

The special refractory aluminous cement of novel composition, which is used as a binder in the refractory concrete mixture from which the furnace linings according to the present invention may be cast has the following composition:

| | Per cent |
|---|---|
| Alumina | About 60 to 75 |
| CaO | About 24 to 40 |
| Silica | Less than 1.1 |
| Iron oxides | Less than 2 |

A specific aluminous cement, according to a preferred embodiment of my invention, may, e. g., have the following composition:

| | Per cent |
|---|---|
| $Al_2O_3$ | 67.2 |
| CaO | 30.8 |
| $SiO_2$ | 1.1 |
| Impurities | 0.9 |

I have found that a cement of this type which contains a high percentage of alumina and a comparative small amount of silica while being nearly or completely free of iron oxides improves greatly the heat resistance of concrete formed with such cement as a binder. I have also found that the comparatively slight decrease in tensile strengths of the concrete due to the reduced proportion of iron oxides in the aluminous cement binders according to my invention is of minor importance in the case of furnace linings which are usually not subjected to heavy tensile stresses. In practice, the decrease in tensile strength is more than counter-balanced by the improved fire and heat resistance of the lining. The specific aluminous cements, used according to my invention, may be manufactured, e. g. by fusing a raw material such as a properly cemented bauxite, rich in alumina and containing up to 20% iron oxide and a relatively small percentage of silica with a suitable quantity of lime under conditions whereby most of the iron oxides are eliminated from the fused mass, the latter being subsequently ground in the usual manner.

Another possibility is to fuse an alumina containing raw material which is entirely or substantially free of iron oxides and silica such as, e. g. unscalped settling tank fines (electrically fused aluminum) with a properly calculated quantity of limestone, and grinding the resulting fused mass.

The refractory aluminous cements obtained in this manner may be mixed with various more or less refractory fillers such as bauxite, kyanite, ground carborundum, calcined fireclay, chrome ore, etc.

Excellent results have been obtained, e. g., with a mixture containing one part by weight of my new refractory aluminous cement to four parts by weight of grog.

The following examples may serve to illustrate without limiting the invention.

Example 1

80 parts by weight of a bauxite containing about 75% $Al_2O_3$, 1% $SiO_2$, 12% $Fe_2O_3$ and 12% $H_2O$, and 38 parts by weight of a high grade lime containing about 98% CaO and 2% impurities in the form of silica, iron oxides, alumina, and magnesia were fused together in a furnace under conditions whereby about 82% of the iron were eliminated from the fused mass. After grinding, a cement was obtained having the following composition:

| | Per cent |
|---|---|
| $Al_2O_3$ | 60.06 |
| $SiO_2$ | 1.0 |
| $Fe_2O_3$ | 1.8 |
| CaO | 37.04 |
| Other impurities | 0.1 |

This cement was mixed with a 35 mesh calcined kyanite in a proportion of one part by weight cement to three parts by weight to kyanite and about 75 parts by weight of water were added. The mixture was formed into a number of test bars and fusion cones. Upon curing it developed a good hard set inside of three hours. The average breaking strength of the test bars after hardening was 850 lbs. per square inch and the P. C. E. of the fusion cones was found to be above cone 16. Fusion occurred in the neighborhood of 2680° F.

Example 2

55 parts by weight of unscalped settling tank fines (electrically fused aluminum) containing about 90% $Al_2O_3$ and 10% impurities and being practically free of iron oxide and silica, were fused in a crucible at about 2750° F. with 45 parts by weight of a limestone containing 97% $CaCO_3$, 1.87% $SiO_2$ and 1.13% $MgCO_3$. The fused mixture was rapidly cooled and then ground into a cement containing:

| | Per cent |
|---|---|
| $Al_2O_3$ | 67.2 |
| CaO | 30.8 |
| $SiO_2$ | 1.1 |
| Other impurities | 0.9 |

This cement was mixed with grog and water in the following proportions:

| | Parts by weight |
|---|---|
| Cement | 200 |
| Grog | 800 |
| Water | 180 |

The resulting plastic mixture was formed into test bars and fusion cones. Set occurred after about three hours curing. The average breaking strength of the test bars was found to be 503 lbs. per square inch. The P. C. E. of the fusion cones was in the neighborhood of cone 19. Flash fusion occurred at 2770° F.

Example 3

60 parts by weight of unscalped settling tank fines containing about 90% $Al_2O_3$ and 10% impurities and being practically free of iron oxides and silica were fused with 33 parts by weight of a limestone containing 97% $CaCO_3$, 1.87% $SiO_2$ and 1.13% $MgCO_3$ in a process as described in Example 2. After grinding, a cement was obtained having the following composition:

| | Per cent |
|---|---|
| $Al_2O_3$ | 74.66 |
| CaO | 24.0 |
| $SiO_2$ | 0.8 |
| Other impurities | 0.54 |

This cement was mixed with grog in the proportion of one to four and the mixture was stirred with sufficient water to permit the molding of test bars and fusion cones. The test bars were cured for three hours. Their average breaking strength after hardening was 470 lbs. per square inch. The P. C. E. of the fusion cones was above 20 and fusion occurred at 2890° F.

I claim:

1. In a furnace, a lining made from a refractory concrete consisting of an intimate mixture of an inert filler with an aluminous cement binder comprising about 60 to 75% alumina, about 20 to 40% CaO and less than 2% iron oxides, the remainder of the concrete being formed by an inert filler.

2. In a furnace, a lining made from a refractory concrete consisting of 20 to 25% by weight of an aluminous cement comprising about 60 to 75% alumina, about 20 to 40% CaO and less than 2% iron oxides, the remainder of the concrete being formed by an inert filler.

3. In a furnace, a lining made from a refractory concrete consisting of an intimate mixture of an inert filler with an aluminous cement binder comprising about 60 to 75% alumina, about 20 to 40% CaO, less than 2% iron oxides and up to 1.1% silica, the remainder of the concrete being formed by an inert filler.

4. In a furnace, a lining made from a refractory concrete consisting of 20 to 25% by weight of an aluminous cement comprising about 60 to 75% alumina, about 20 to 40% CaO, less than 2% iron oxides, and up to 1.1% silica, the remainder of the concrete being formed by an inert filler.

5. In a furnace, a lining made from a refractory concrete mixture consisting of about 4 parts by weight of grog intimately mixed with one part by weight of an aluminous cement comprising about 60 to 75% alumina, about 24 to 40% CaO, less than 2% iron oxides, and up to 1.1% silica.

6. In a furnace, a lining made from a refractory concrete mixture consisting of about 4 parts by weight of grog intimately mixed with about one part by weight of an aluminous cement comprising 67.2% $Al_2O_3$, 30.8% CaO, 1.1% $SiO_2$ and 0.9% impurities.

HORACE N. CLARK.